(12) United States Patent
Walsh et al.

(10) Patent No.: US 12,025,387 B2
(45) Date of Patent: Jul. 2, 2024

(54) TURNING VANES AND HEAT EXCHANGERS AND METHODS OF MAKING THE SAME

(71) Applicant: MEGGITT AEROSPACE LIMITED, Christchurch (GB)

(72) Inventors: Philip Walsh, Knowle (GB); Benjamin Thomas Matthews, Sutton Coldfield (GB); Christopher Simon Elliott, Worcestershire (GB); Steven William James Henderson, Rugby (GB); Jeffrey Allen Lehew, Missouri City, TX (US); Christopher Charles Hood, Hinckley (GB); Salvatore Ippedico, Dorridge (GB)

(73) Assignee: MEGGITT AEROSPACE LIMITED, Christchurch (GB)

( * ) Notice: Subject to any disclaimer, the term of this patent is extended or adjusted under 35 U.S.C. 154(b) by 554 days.

(21) Appl. No.: 16/984,078

(22) Filed: Aug. 3, 2020

(65) Prior Publication Data
US 2021/0041188 A1 Feb. 11, 2021

Related U.S. Application Data

(60) Provisional application No. 62/883,568, filed on Aug. 6, 2019.

(51) Int. Cl.
*F28F 9/02* (2006.01)
*F01D 1/14* (2006.01)
(Continued)

(52) U.S. Cl.
CPC .................. *F28F 9/02* (2013.01); *F01D 1/14* (2013.01); *F01D 25/14* (2013.01); *F02C 7/16* (2013.01);
(Continued)

(58) Field of Classification Search
CPC .......... F28F 9/02; F28F 3/08; F28F 2009/222; F28F 2215/02; F01D 1/14; F01D 25/14;
(Continued)

(56) References Cited

U.S. PATENT DOCUMENTS 4,183,403 A * 1/1980 Nicholson ............... F28F 3/046
165/DIG. 387
4,793,247 A * 12/1988 Verweij ................. B01F 35/712
366/338

(Continued)

*Primary Examiner* — Raheena R Malik
(74) *Attorney, Agent, or Firm* — ORBIT IP, LLP

(57) ABSTRACT

Heat exchanger assemblies including turning vanes are taught herein. In preferred embodiments, the heat exchanger assembly comprises: an inlet duct; a heat exchanger coupled to the inlet duct and a plurality of turning vanes coupled to the heat exchanger and protruding into the inlet duct. The intake plane of the heat exchanger is at an angle between 0 degrees and 90 degrees to the primary flow direction of the inlet duct. The plurality of turning vanes comprise: a straight leading edge of length L that is parallel to the primary flow direction of the inlet duct; a convex lower surface that transitions a bottom of the leading edge to an upper wall of a lower channel of the heat exchanger; and a concave upper surface that transitions a distal point of the turning vane to a second channel of the heat exchanger.

19 Claims, 18 Drawing Sheets

(51) Int. Cl.
  *F01D 25/14* (2006.01)
  *F02C 7/16* (2006.01)
  *F28F 3/08* (2006.01)
  *F28F 9/22* (2006.01)

(52) U.S. Cl.
  CPC ............ *F28F 3/08* (2013.01); *F05D 2250/38* (2013.01); *F05D 2260/213* (2013.01); *F28F 2009/222* (2013.01); *F28F 2215/02* (2013.01)

(58) Field of Classification Search
  CPC ... F02C 7/16; F05D 2250/38; F05D 2260/213
  USPC ........................................................ 165/167
  See application file for complete search history.

(56) References Cited

U.S. PATENT DOCUMENTS

| | | | | |
|---|---|---|---|---|
| 5,463,967 | A * | 11/1995 | Gielow | F28C 3/02 110/263 |
| 7,331,376 | B2 * | 2/2008 | Gagnon | F28D 9/0068 165/166 |
| 8,376,036 | B2 * | 2/2013 | Kammerzell | F24F 12/006 165/166 |
| 10,809,007 | B2 * | 10/2020 | Martinez | F28D 7/0033 |
| 10,830,543 | B2 * | 11/2020 | Schmitz | F28F 9/0265 |
| 11,493,286 | B1 * | 11/2022 | Kirsch | F28F 9/0275 |
| 2003/0201094 | A1 * | 10/2003 | Evans | F28F 3/027 165/167 |
| 2005/0039899 | A1 * | 2/2005 | Brost | F28F 3/044 165/167 |
| 2005/0056411 | A1 * | 3/2005 | Dilley | F28D 9/0018 165/167 |
| 2006/0196649 | A1 * | 9/2006 | Shibata | F28D 9/0037 165/166 |
| 2006/0249282 | A1 * | 11/2006 | Song | F28F 3/10 165/DIG. 365 |
| 2007/0006998 | A1 * | 1/2007 | Brost | F28F 3/044 165/167 |
| 2007/0023175 | A1 * | 2/2007 | Richter | F28F 3/025 165/167 |
| 2007/0074859 | A1 * | 4/2007 | Nakada | F28D 1/0375 165/167 |
| 2008/0156469 | A1 * | 7/2008 | Lee | F28D 9/0062 165/166 |
| 2008/0156470 | A1 * | 7/2008 | Lee | F28D 9/0068 165/166 |
| 2008/0156471 | A1 * | 7/2008 | Han | F28F 13/06 165/166 |
| 2010/0224347 | A1 * | 9/2010 | Urch | F24F 12/006 165/166 |
| 2014/0231057 | A1 * | 8/2014 | Schalansky | F28F 9/02 165/169 |
| 2016/0231068 | A1 * | 8/2016 | Schmitz | B23P 15/26 |
| 2017/0023311 | A1 * | 1/2017 | Urbanski | F28F 9/0268 |
| 2017/0146305 | A1 * | 5/2017 | Kuczek | F28F 9/0268 |
| 2019/0323429 | A1 * | 10/2019 | McGee | F02C 7/25 |
| 2020/0040765 | A1 * | 2/2020 | Walsh | F02C 7/125 |
| 2020/0217591 | A1 * | 7/2020 | Henderson | F28F 1/022 |
| 2021/0041188 | A1 * | 2/2021 | Walsh | F01D 1/14 |

* cited by examiner

TURNING VANES AND HEAT EXCHANGERS AND METHODS OF MAKING THE SAME

CROSS-REFERENCE TO RELATED APPLICATION

This patent document claims the benefit of U.S. Provisional Application Ser. No. 62/883,568, filed on Aug. 6, 2019, the contents of which are incorporated herein by reference in their entirety and are to be considered a part of the specification.

FIELD

This patent document relates to turning vanes incorporated into heat exchangers and heat exchangers and methods of making the same. In particular, this patent document relates to new designs and methods for designing turning vanes and their use in combination with heat exchangers.

BACKGROUND

Traditionally nacelles house a multitude of components including the accessories gearbox, air-oil heat exchangers and the Full Authority Digital Engine Control ("FADEC"). With increasing fan diameters, the drag generated by the nacelle becomes too large, necessitating thinner, slim-line nacelles.

These thinner nacelles cannot house the components traditionally housed within the nacelle, instead these components have to be housed within the core zone. As the core zone already houses ducting, pipework, bleed systems and other components, relocated hardware previously housed within the nacelle can prove to be a challenge due to envelope constraints.

Next generation thermal management systems such as Meggitt's Turn Diffuser/Inclined Heat Exchanger (U.S. Patent Publication No.: 2020/0040765 hereby incorporated in its entirety), serve as examples where inclining the heat exchanger relative to the incoming flow allows packaging of a larger heat exchanger in a smaller volume by vastly reducing the volume occupied by the inlet duct/diffuser.

In cross-flow plate and fin style heat exchangers, all gas-side channels experience some kind of entry and exit loss due to a separation layer that is formed by the gas hitting the liquid or opposing gas layer's blunt edge. For heat exchangers with disrupted fins or with longer flow lengths, the amount of total pressure loss attributed to the entry and exit losses is negligible when compared to the total pressure loss across the heat exchanger.

FIG. 1 illustrates a cross-sectional view of a pressure profile for the total pressure through a single fin of a plate and fin style heat exchanger where the fluid entering the heat exchanger is perfectly aligned with the heat exchanger. FIG. 1 is a Total Pressure Contour Plot. The fluid passing through the example in FIG. 1 is a compressible gas and the flow direction is aligned to the channel axis. The red areas indicate high total pressure and green, low pressure. As the flow enters the channel the formation of the boundary layer can be observed, depicted by the green/yellow layer close to the wall signifying a layer of low velocity gas.

When the gas flow is not aligned to the channel axis the separation layer that is formed increases to a point where the resultant total pressure loss represents a more significant portion of the total pressure loss across the entire heat exchanger. FIG. 2 illustrates a cross-sectional view of a pressure profile for an example where the fluid enters the heat exchanger at an angle. FIG. 1 is also a Total Pressure Contour Plot but for an angled entry. As may be seen in FIG. 2, there is a higher total pressure loss across the entrance of the channel as well as the formation of a large separation layer due to the inclined flow.

To fully realise the benefits of a heat exchanger application where the inlet flow is not aligned to the flow channels, a mechanism for reducing the associated total pressure loss at the entrance of the heat exchanger is required.

The problem is also applicable for radial inflow and radial outflow heat exchangers where, typically, the heat exchanger surface is at 90° to the incoming flow stream.

FIG. 3 illustrates an isometric view of a typical plate and fin style heat exchanger 10. Plate and fin style heat exchangers 10 may include gas-gas, gas-liquid and liquid-liquid arrangements. All of the designs utilize the same concept which is depicted in FIG. 3. The plate and fin heat exchanger 10 shown in FIG. 3, comprises a top plate 12, a plurality of fluid separator sheets 14, a hot fluid sidebar 16 and a cold fluid sidebar 18.

The core or matrix of the plate and fin heat exchanger 10 is comprised of alternating hot and cold fluid layers. Each layer is bound laterally by a side bar 16 and 18, and bound vertically with separator sheets 14. The separator sheets 14 prevent the two fluids from mixing and the side bars 16 and 18 retain the fluid within a given layer. The side bars 16 and 18 also provide locations to allow headers to be welded to the core. The separator sheets provide primary surface area between the two fluids; that is thermal energy is conducted from one surface of the separator sheet to the other. Within each fluid layer is a fin foil which adds secondary surface area; that is the thermal energy conducted through the fin thickness is transferred from one fluid to the other via a separator sheet.

FIG. 4 illustrates a cross-sectional view of the plate and fin heat exchanger 10 of FIG. 3. FIG. 4 shows how each layer, such as an oil layer, is confined by a separator sheet 14 on either side. On the edges of the layers, a side bar 16 terminates the layer. FIG. 4 shows how the side bar 16 and separator sheets 14 configuration create a 'bluff' leading edge 18 for the fluid. As discussed herein, this leading edge 18 creates a total pressure loss as the fluid flow contracts into the fin channel.

Typically, gas-liquid heat exchangers designed for gas turbine applications require the gas side of the flow paths to be resilient to the impact of objects such as hail stones. Both the gas side and the liquid sides are required to be resilient to the ingress of foreign objects.

As the fin foils 20 are typically made from a thin metal, they alone are not inherently resistant to strikes from objects such as hail stone. To protect the fin foils 20 from hail stone strikes and impacts by other objects, a thicker fin is placed on the inlet face.

The hail fins add additional weight to the core and, as the heat transfer performance is low, they reduce the effect flow length of the heat exchanger decreasing the available heat transfer area.

Within aerospace gas-turbine applications, cold start sequences must be considered during the design of the heat exchanger. At low temperatures, the operating liquid, often hydraulic oil, may become very viscous dramatically increasing the pressure loss across the heat exchanger. In extreme cases, the core will become blocked. To allow the heat exchanger to purge itself of the cold viscous fluid, a thicker layer is used in conjunction with low pressure loss fin foils. Fluid flow through the de-congealing layer is controlled via a passive valve. The thickness layer presents a larger 'bluff' leading edge 18 for the opposing fluid.

What is needed are designs for heat exchangers that minimize footprint and weight while maximizing performance. What is further needed is a way to allow heat exchangers to be oriented to reduce the area required for the heat exchanger while still minimizing the pressure drop across the heat exchanger.

SUMMARY

The present patent document teaches heat exchanger assemblies that include turning vanes or turning vane like features. The turning vanes and/or turning vane like features help eliminate or at least reduce some of the inefficiencies of heat exchanger assemblies in the prior art.

In preferred embodiments the heat exchanger assemblies comprise: an inlet duct; a heat exchanger coupled to the inlet duct wherein an intake plane of the heat exchanger is at an angle between 0 degrees and 90 degrees to the primary flow direction of the inlet duct; and a plurality of turning vanes coupled to the heat exchanger and protruding into the inlet duct. An important aspect of the invention is the particular design of the turning vanes which preferably comprises: a straight leading edge of length L that is parallel to the primary flow direction of the inlet duct; a convex lower surface that transitions the bottom of the leading edge to a first channel of the heat exchanger; and a concave upper surface that transitions a distal point of the turning vane to a second channel of the heat exchanger.

The teachings herein may be applied to many different kinds of heat exchangers. In some embodiments, the heat exchanger may be a plate and fin heat exchanger. In other embodiments, the heat exchanger may be a radial inflow or a radial outflow heat exchanger. In yet other embodiments, the heat exchanger may be an inclined heat exchanger. In still yet other embodiments, the heat exchanger may be an additive manufactured heat exchanger. In still yet other embodiments, the heat exchanger may be a structured lattice style heat exchanger made using additive manufacturing. Above are just a few possible heat exchangers that the current embodiments may be implemented with and in general, the applications are not limited to any particular type of heat exchanger.

In preferred embodiments, the convex lower surface is tangential to the bottom of the straight leading edge. In addition, the convex lower surface is preferably tangential to the upper wall of the channel situated below the convex lower surface.

In some embodiments, each turning vane in the plurality of turning vanes further comprises a distal tip that is defined by an arc with radius r. The distal tip is tangential to both a top of the leading edge and the concave upper surface. In some embodiments, radius r is zero and the distal tip is a point.

For many types of heat exchangers, including plate and fin for example, the plurality of turning vanes may each be coupled to a sidebar of the heat exchanger. The coupling may be carried out in any number of ways including, mechanically coupled, brazing or welding and/or bonding. In preferred embodiments, the plurality of turning vanes are each mechanically coupled to a sidebar of the plate and fin heat exchanger. In even more preferred embodiments, the plurality of turning vanes are each mechanically coupled to a sidebar of the plate and fin heat exchanger using a dovetail joint.

In many implementations, it is preferable to have the turning vanes create diffusers. In preferred embodiments, a throat followed by a diffuser is formed between adjacent turning vanes in the plurality of turning vanes.

Additional surface features may be added to the turning vanes in order to adjust the flow characteristics. These additional surface features may include but are not limited to structures such as dimples or vortexes. In preferred embodiments, each turning vane in the plurality of turning vanes includes additional surface features.

In addition to turning vanes that protrude outside the heat exchanger matrix, this patent document also teaches that the heat exchanger matrix itself may be curved to create a turning vane. In some embodiments, the heat exchanger comprises a heat exchanger matrix that is curved in the direction of an inlet or outlet flow.

The turning vanes may be added to the heat exchanger in many different configurations. In some embodiments, each turning vane in the plurality of turning vanes is located on every other sidebar. In other embodiments, the density, size and shape of the turning vanes may be varied across the length of the heat exchanger and may be varied to match an intake flow.

In addition, turning vanes may be added to both the intake side and the exit side of the heat exchanger. In some embodiments, a second plurality of turning vanes is coupled to the heat exchanger and protrude into an outlet duct.

DETAILED DESCRIPTION OF THE INVENTIONS

The present patent document discloses embodiments of heat exchange assemblies and their integration. Preferably, the assemblies taught herein have increased efficiency and a decreased mounting footprint. Applicant's extensive research has demonstrated the benefits of inclining the intake plane of the heat exchanger to the inlet duct air flow direction at the intake plane. As used herein, the term "inlet duct air flow direction" means the dominant direction of travel of the airflow as it passes through the inlet duct. Where the walls of the inlet duct are parallel, the dominant direction may generally be assumed to be parallel to the walls. Where the walls of the inlet duct form a constant area, or near constant area, then the dominant flow direction may generally be assumed to be parallel with the centerline.

In various places throughout this patent document, reference is made to angling the heat exchanger. When this patent document refers to angling the heat exchanger, such a reference refers to the front plane or input plane of the heat exchanger with respect to the air flow direction of the inlet duct at the intake plane of the heat exchanger. If the heat exchanger input plane is curved, the input plane is the plane tangent to the curved surface at the centerline of the inlet duct.

Inclining the intake plane of the heat exchanger to the inlet duct air flow direction increases the area of the heat exchanger along the intake plane that is in contact with the air in the inlet duct. Because the area of the heat exchanger in contact with the air duct is larger than the cross section of the inlet duct perpendicular to the air flow, a natural inlet diffuser is created as the air turns resulting in a very compact package. This is in contrast to a typical diffuser which expands the cross-section of the duct perpendicular to the flow direction to cause the flow to slow down in response to the Bernoulli principle, which requires a long diffuser duct. Utilizing the turn in the flow for diffusion and maintaining an inlet duct of constant area, or near constant area, allows for a significantly shorter design.

In various places throughout the detailed description, Applicant refers to "oil layer" or "fluid layer" or "air intake". These are phrases used to help describe particular embodiments related to oil-air heat exchanger for use with aircraft. However, the embodiments herein can be applied to any type of heat exchanger including air-air, oil-air, fluid-air, fluid-fluid etc. and to any application not just aircraft. Moreover, while as used herein, when discussing the "oil layer" and "air flow", the Applicant is simply describing one flow relative to the other and the teachings herein are equally applicable to embodiments with the hot and cold flows reversed.

Figure 5:
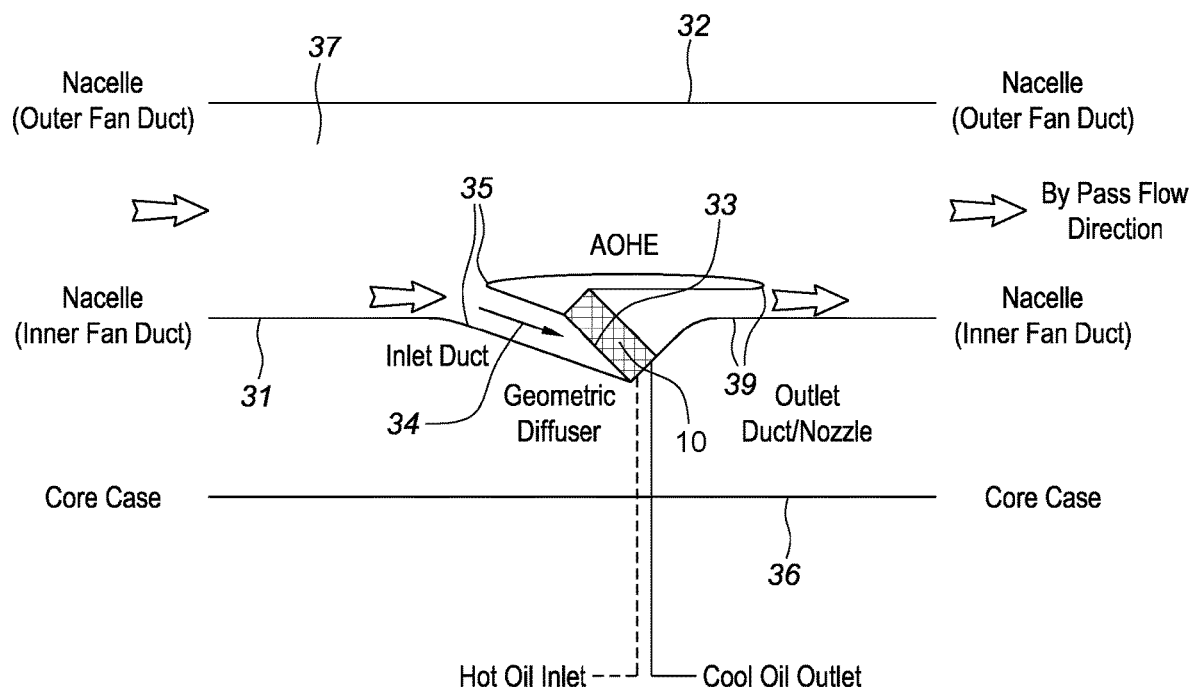
FIG. 5 illustrates a cross-sectional schematic view demonstrating one embodiment of a heat exchanger with the intake plane angled to the inlet duct air flow direction at the intake plane.

FIG. 5 illustrates a cross-sectional schematic view demonstrating one embodiment of a heat exchanger 10 with the intake plane 33 angled to the inlet duct air flow direction 34 at the intake plane 33. As may be seen in FIG. 5, an inlet duct 35 takes low temperature air from the secondary flow stream 37 (bypass duct) and passes it through an inclined heat exchanger 10. The inclination of the heat exchanger 10, relative to the inlet duct air flow direction 34, provides the diffusion. Creating diffusion without the use of an actual diffuser allows for a more efficient and effective design. After passing through the heat exchanger 10, the air is then returned, via an outlet duct 39, back into the bypass duct 37 with minimal pressure loss and flow disturbance. This arrangement also allows for a heat exchanger assembly that is significantly smaller in size than a traditionally designed and sized assembly.

Although in FIG. 5 the inclination is depicted as being fore to aft, the inclination could also be aft to fore. In other embodiments, the inclination could be left to right or right to left (into the page or out of the page). In addition, the inclination could also be a compound angle. For example, in addition to being fore to aft, the inclination could also be, left to right relative to the engine, depending on specific requirements. In other embodiments, other angles between the intake plane 33 of the heat exchanger 10 and the inlet duct air flow direction 34 may be used. Any angle that increases the surface area of the heat exchanger along the intake plane with respect to the cross-section of the inlet duct may be used.

As may be appreciated, angling the heat exchanger 10 to create the diffusion instead of creating diffusion by increasing the area of the inlet duct as it approaches the heat exchanger 10 creates a smaller inlet duct 35 and thus, allows for a more compact design. In addition, angling the heat exchanger 10 allows for a lower profile of the heat exchanger and ducting allowing the entire assembly to have a lower height significantly helping its integration with the engine and bypass duct. This creates a much smaller overall packaged design in the parent engine. In an application where inlet fluid flow is angled relative to the heat exchanger flow channels, turning vanes which protrude from the front face of the heat exchanger helps the fluid turn into the heat exchanger flow channels.

Figure 1:
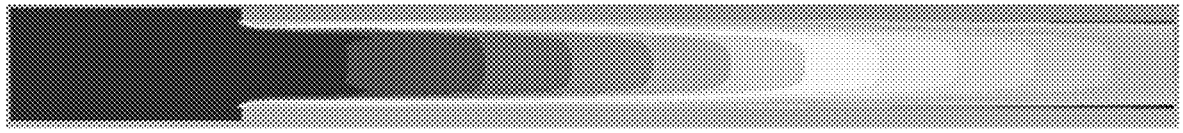
FIG. 1 illustrates a cross-sectional view of a pressure profile for the total pressure through a single fin of a plate and fin style heat exchanger where the fluid entering the heat exchanger is perfectly aligned with the heat exchanger.
Figure 2:
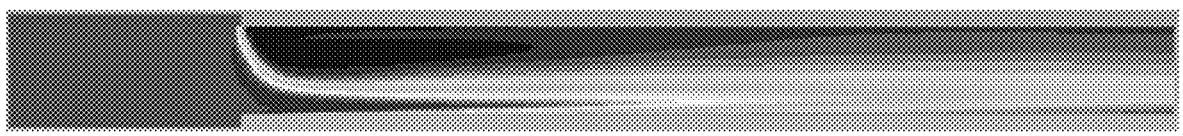
FIG. 2 illustrates a cross-sectional view of a pressure profile for an example where the fluid enters the heat exchanger at an angle.
Figure 3:
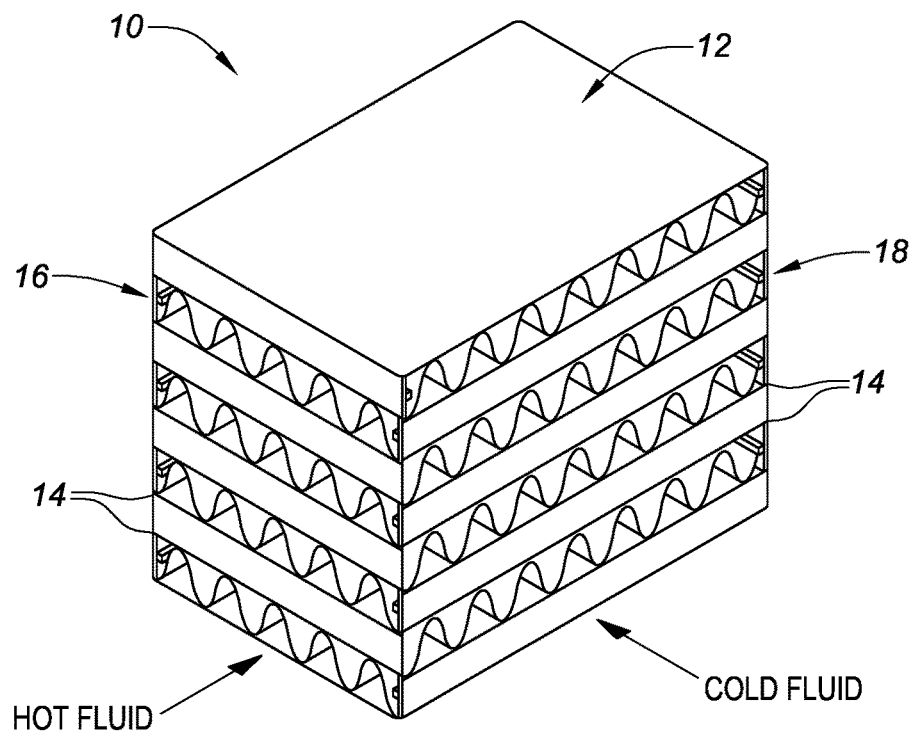
FIG. 3 illustrates an isometric view of a typical plate and fin style heat exchanger.
Figure 4:
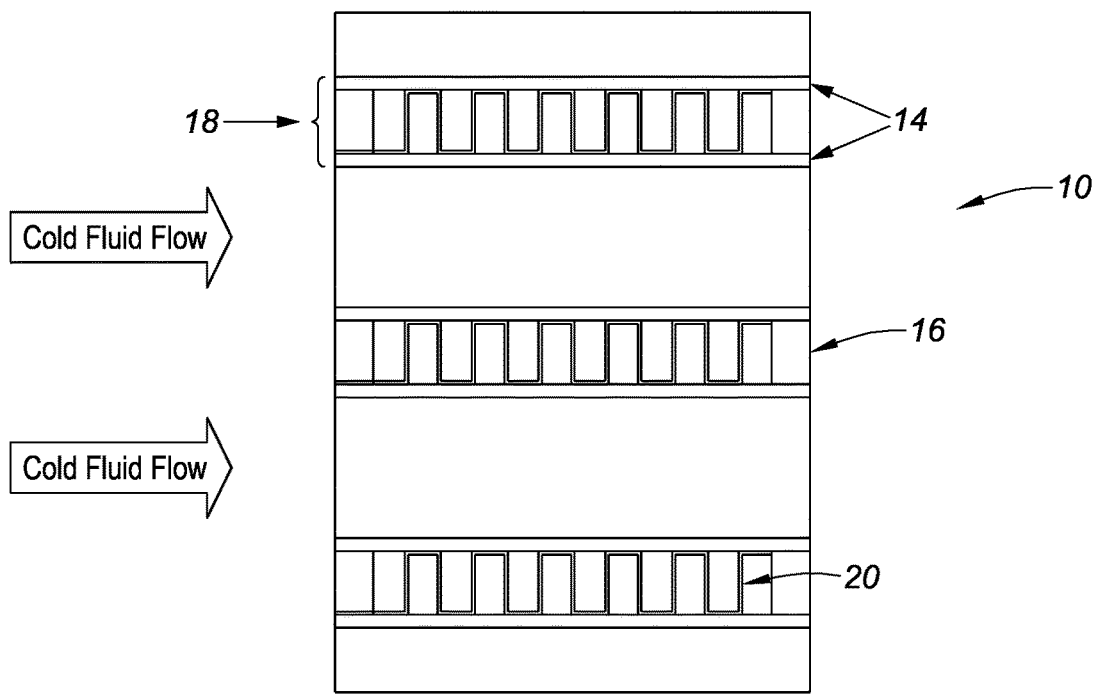
FIG. 4 illustrates a cross-sectional view of the plate and fin heat exchanger of FIG. 3.

In different embodiments, the turning vanes may be coupled to the front face of the heat exchanger in many different ways. For example, they may be brazed, welded, mechanically coupled or formed as an integral part of the heat exchanger. In some embodiments, the turning vanes may be created by extending the side bar 16. By changing the shape of the side bar to something which is more aerodynamically aligned with the inlet gas flow direction, there is the opportunity to decrease the total pressure loss across the entrance of the flow channel. These methods work by reducing the separation layer that is formed as the flow contracts into the flow channel, as seen in FIG. 2 and FIG. 1.

Figure 6A:
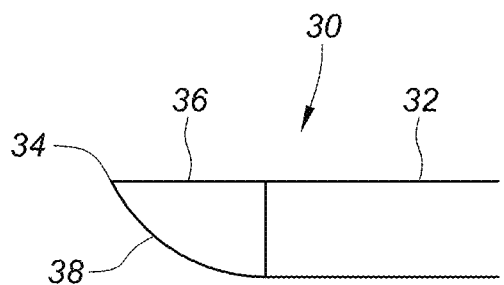
FIG. 6A illustrates a profile view of a turning vane with a distal tip that is flat along the top but has a bottom that curves up from the bottom surface of the body to form a point with the top surface at the distal tip.
Figure 6B:
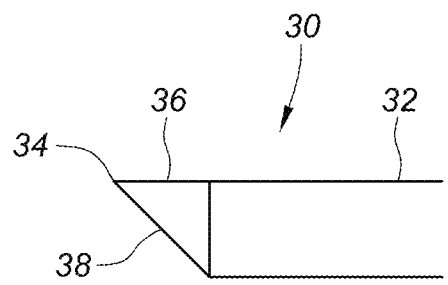
FIG. 6B illustrates a profile view of a turning vane with a distal tip that is flat along the top but has a bottom that angles up from the bottom surface of the body to form a point with the top surface at the distal tip.
Figure 6C:
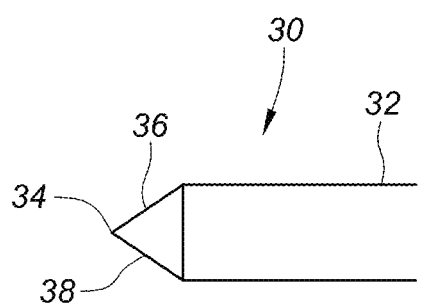
FIG. 6C illustrates a profile view of a turning vane with a distal tip that has a top surface that is angled downwards and a bottom surface that is angled upwards to form a point at the distal tip.
Figure 6D:
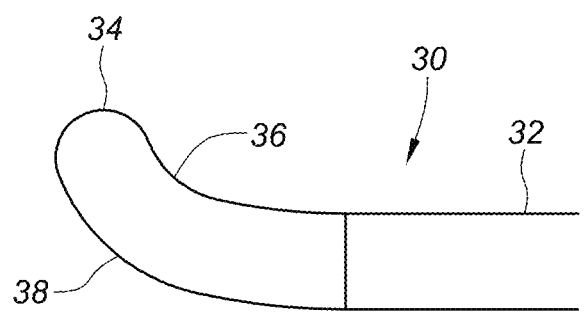
FIG. 6D illustrates a profile view of a turning vane with a distal tip that is rounded and a top surface that curves upward and a bottom surface that curves upward to match the top surface and form a turning vain with a profile that curves upward.
Figure 6E:
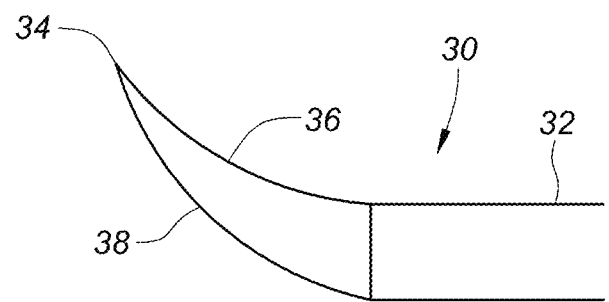
FIG. 6E illustrates a profile view of a turning vane with a distal tip that forms a point with a top surface that curves upward and a bottom surface that curves upward to match the top surface and form a turning vain with a profile that curves upward.

FIGS. 6A through 6E illustrate a plurality of different cross-section shapes a turning vane 30 can take. FIG. 6A illustrates a turning vane 30 with a distal tip 34 that is flat along the top 36 but has a bottom 38 that curves up from the bottom surface of the body 32 to form a point with the top surface 36 at the distal tip 34. FIG. 6B illustrates a turning vane 30 with a distal tip 34 that is flat along the top 36 but has a bottom 38 that angles up from the bottom surface of the body 32 to form a point with the top surface 36 at the distal tip 34. FIG. 6C illustrates a turning vane 30 with a distal tip 34 that has a top surface 36 that is angled downwards and a bottom surface 38 that is angled upwards to form a point at the distal tip 34. FIG. 6D illustrates a turning vane 30 with a distal tip 34 that is rounded and a top surface 36 that curves upward and a bottom surface 38 that curves upward to match the top surface 36 and form a turning vane 30 with a profile that curves upward. FIG. 6E illustrates a turning vane 30 with a distal tip 34 that forms a point with a top surface 36 that curves upward and a bottom surface 38 that curves upward to match the top surface 36 and form a turning vain 30 with a profile that curves upward. FIG. 6E is similar to FIG. 6D except the distal tip 34 in the embodiment illustrated in 6E forms a point whereas the distal tip 34 in the embodiment in FIG. 6D is rounded.

FIGS. 6A-6E are examples of a number of turning vane profiles. However, the turning vane can be of any shape. Moreover, the angle of the turning vane 30 relative to incoming flow vector can be varied over a range of 0° to 90°, and does not necessarily have to match the angle of attack of the inlet gas flow. To this end, any of the turning vanes 30 in FIGS. 6A-6E may extend away from the intake plane of the heat exchanger at any angle 0° to 90°. The feature angle can also vary over the height of the heat exchanger to match the incoming flow profile.

Depending on the ratio of the channel heights and the incoming flow angle, it is possible to design the turning vanes so that the geometric flow area between the turning vanes can be either larger or equal to the flow area of the channel. For steep inclination angles, this however is not possible and the flow must contract into the flow channel between the vanes before expanding into the flow channel.

Through extensive testing, the Applicant has realized that the most efficient designs utilize the Coanda effect to further minimize flow separation as the flow turns into the fin channel. The flow attaches to surfaces parallel to the flow vector and remains attached whilst flowing around the following convex surface of the turning vane. If the geometry is such that a constant flow area cannot be achieved; the lower portion of the turning vane is profiled to give a diffuser geometry which allows for some pressure recovery.

Figure 7:
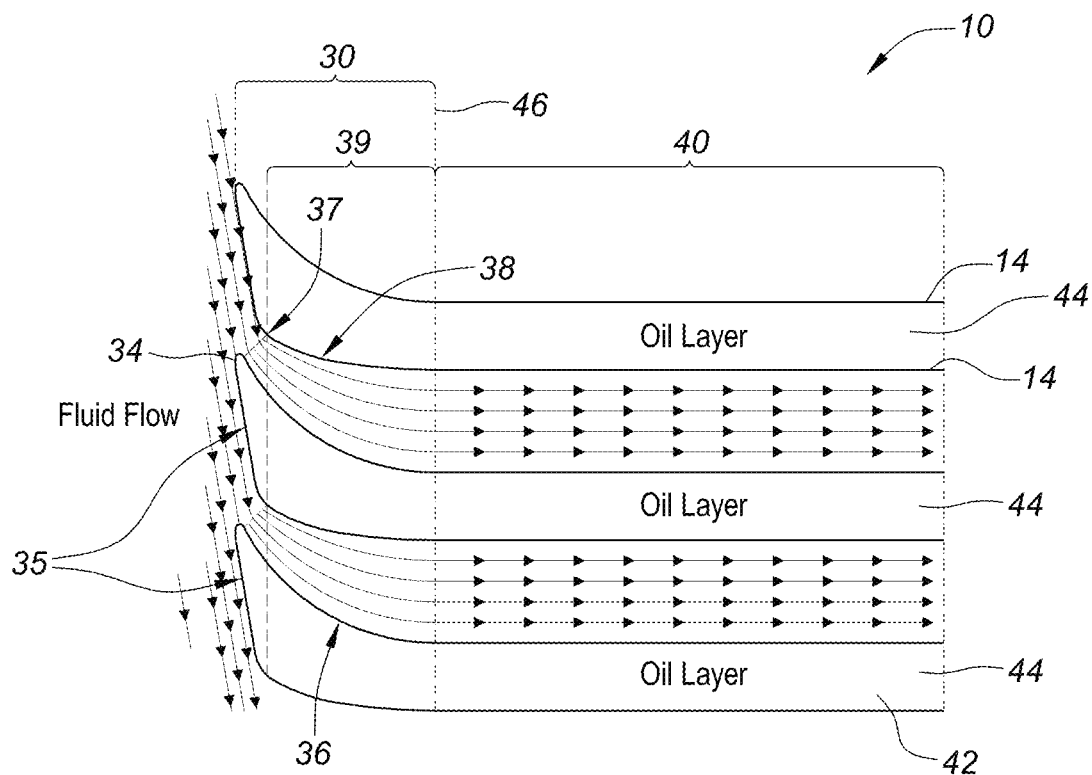
FIG. 7 illustrates a cross sectional view of a heat exchanger that includes a full turning vane style designed to utilize the Coanda effect.

FIG. 7 illustrates a cross sectional view of a heat exchanger that includes a full turning vane style designed to utilize the Coanda effect. As may be seen in FIG. 7, the Fin Channel 40 defines the main body 42 of the heat exchanger 10. The primary flow direction of the fluid flow into the heat exchanger 10 is parallel to the surfaces of the oil layers 44. Each oil layer 44 is defined by a pair of separation sheets 14. The primary flow direction of the air intake is parallel to the walls of the intake as it approaches the intake plane 46 of the heat exchanger 10. As may be appreciated, in the example shown in FIG. 7, the primary flow direction of the air intake is at about an 80-degree angle to the primary flow direction of the heat exchanger 10. Accordingly, turning vanes 30 can be added upstream to the intake plane 46 to help turn the air in the air intake into the heat exchanger 10.

As may be seen in FIG. 7, the turning vanes 30 are an extension of the side bars (not shown) that define the ends of the oil layers 44. The portion of the oil layer 44 designated as the turning vane 30 is the portion upstream of the intake plane 46. The intake plane 46 can be defined by where the surfaces of the oil layers 44 begin running parallel. In the embodiment show in FIG. 7, the lower surface of a first turning vane 30 is the upper surface of a second turning vane below the first turning vane.

In the embodiment shown in FIG. 7, the distal tip 34 of each turning vane is rounded. The turning vanes 30 are all spaced evenly apart. Starting at the distal tip 34, the leading edge 35 extends down parallel to the primary flow direction of the intake, i.e. parallel to the flow of the incoming air. . In the design in FIG. 7, the leading edge 34 is the thinnest portion of the cross section normal to the heat exchanger inlet plane 46 which reaches its maximum thickness where the throat 37 is formed with the upper surface of the adjacent turning vane. Progressing toward the inlet plane 46, the cross section then gradually reduces until it is equal to the dimensions of the oil layer 44 at the heat exchanger inlet plane 46. In the embodiment shown in FIG. 7, the distance between the bottom of the leading edge 35 and the distal tip of the turning vane below it forms the turning vane throat 37. The throat 37 between each turning vane 3 is the narrowest cross-section into the heat exchanger 10 for the air flowing into the intake. In the embodiment in FIG. 7, the distance between two adjacent turning vanes 30 continually increases from the throat 37 back to the intake plane 46. This creates a diffuser 39 for the intake flow.

The upper surface 36 of each turning vane 30 is concave and the lower surface 38 of each turning vane 30 is convex. The convex lower surface 38 of a first turning vane 30 in combination with the concave upper surface 36 of a second turning vane 30 below the first turning vane 30 creates a diffuser 39 between the throat and the heat exchanger intake plane 46.

Figure 8:
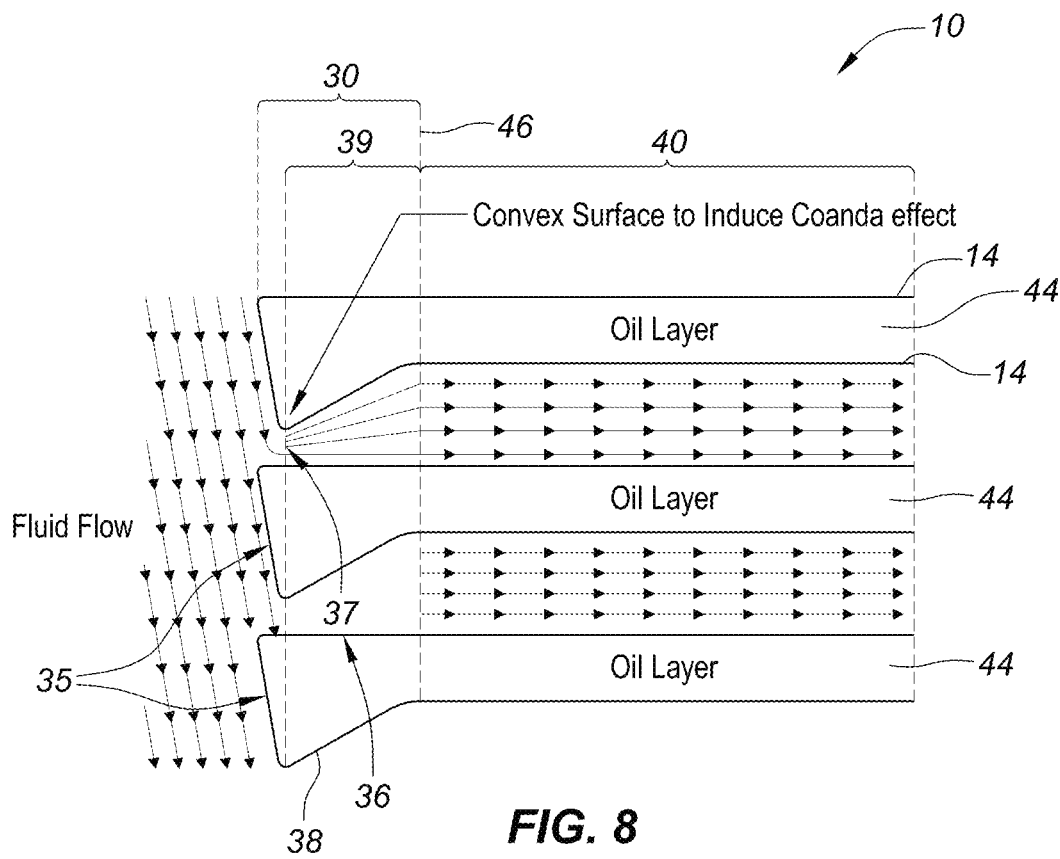
FIG. 8 illustrates a cross sectional view of a heat exchanger that includes a bevel style turning vane designed to utilize the Coanda effect.

FIG. 8 illustrates a cross sectional view of a heat exchanger 10 that includes a bevel style turning vane designed to utilize the Coanda effect. Similar to the turning vane design in FIG. 7, the turning vane of FIG. 8 has a leading edge 35 that runs parallel to the direction of airflow in the intake manifold just prior to entering the heat exchanger. In addition, the thickness of the cross section normal to the heat exchanger inlet plane 46 is at its largest where it forms the throat 37 and gradually decreases until it is equal in height to the oil layer 44 at heat exchanger inlet plane 46. This reduction in cross section of the turning vanes 30 increases the thickness of the cross-section between adjacent turning vanes 30 and creates a diffuser 39 for the incoming flow. The diffuser 39 is defined between the throat 37 and the intake plane 46 of the heat exchanger 10.

While the turning vane designs in FIGS. 7 and 8 have some similarities, their overall designs are different. Generally speaking, the turning vanes in FIG. 7 turn up into the direction of the flow while the turning vanes in FIG. 8 are angled downward. Consequently, the leading edge 35 of the turning vanes 30 in FIG. 7 extend above the top separation sheet 14 of the oil layer 44 they are coupled to. In addition, in the example of FIG. 7, the bottom of the leading edge 35 is above the bottom separation sheet 14 of the oil layer 44 each turning vane 30 is coupled to. In contrast, in the example in FIG. 8, the upper surface 36 of the turning vane is flat. Accordingly, the top of the leading edge 35 is at the same height as the top separation sheet 14 of the oil layer 44 each leading edges is attached to. However, in the example of FIG. 8, the leading edge 35 of each turning vane 30 extends well below the bottom separation sheet 14 of the oil layer 44. The bottom surface 38 of each turning vane in FIG. 8 angles back up towards the bottom separation sheet 14 of the oil layer 44 each turning vane 30 is couple to.

In the example of FIG. 8, each leading edge 35 is parallel to the intake air flow direction and is thus, angled back towards the heat exchanger 10. The intake air flows down past the leading edge 35 and impacts the flat top surface 36 of the adjacent turning vane below. This forces the air back up in between the turning vanes and into the diffuser created between the turning vanes 30. The convex surface that is formed between the bottom of the leading edge 35 and the bottom surface 38 helps induce the Coanda effect.

Figure 9:
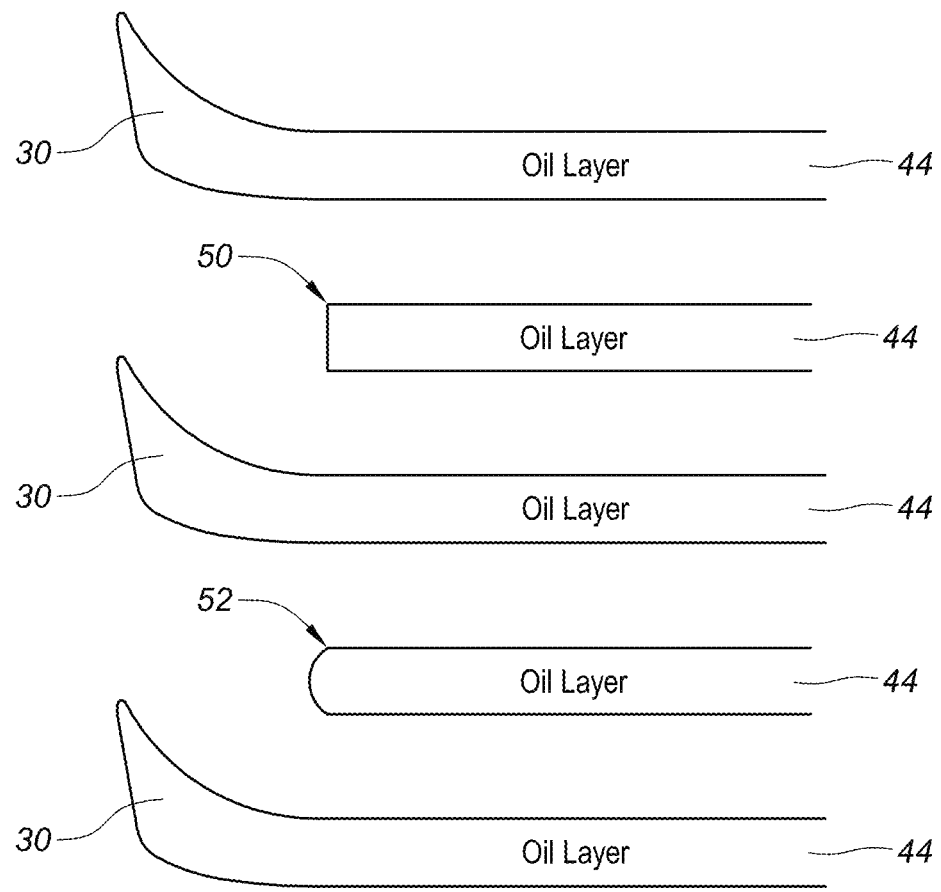
FIG. 9 illustrates an embodiment with an alternating turning vane pattern with turning vane layers interspersed with separation layers.

As may be seen in the embodiments in FIGS. 7 and 8, the turning vanes 30 are evenly spaced from each other and occur on each separation layer 44. However, a turning vane does not have to correspond to every oil layer 44 or indeed cover the entire surface of the heat exchanger 10. FIG. 9 illustrates an embodiment with an alternating turning vane pattern with turning vane layers interspersed with oil layers 44, in this embodiment, "plain" oil layers 44. Note that these "plain" layers could either use current state of the art side bars with a bluff leading edge or use a side bar with a profiled leading edge to aid flow around it. Leading edge 50 illustrates a side bar with a bluff leading edge and leading edge 52 illustrates a side bar with a profiled leading edge.

Although the embodiment shown in FIG. 9 illustrates a turning vane 30 corresponding to every other oil layer 44, i.e. every other sidebar, other embodiments may use other configurations. For example, there may be two adjacent oil layers 44 with a turning vane and then one without. Patterns may be repeated or not repeated. More consecutive adjacent oil layers 44 may have turning vanes such as 3, 4, 5, 6 or more in a row before there is one without. The density of the oil layers 44 that include a turning vane may be higher in one portion of the heat exchanger than another. The density of the turning vanes 30 could either be constant along the width of the heat exchanger 10 or could vary to match a particular flow distribution. Many different embodiments are possible.

Turning vanes 30 are not limited to the intake side of the heat exchanger and turning vanes may be used on the exit side of the heat exchanger to turn the flow leaving the heat exchanger into the primary direction of the exit manifold.

In addition to turning vanes 30, additional geometry may be incorporated such as additional surface features used to promote flow attachment and further reduce total pressure loss. These features would include but are not limited to surface texturing (for example dimpling) and vortex generators.

Additionally, these shaped features can be combined with the de-congealing layer of the heat exchanger in order to turn the de-congealing layer into a turning de-congealing layer. A de-congealing layer is an oil layer that is thicker than standard for a particular heat exchanger and used to aid in starting oil side flow from cold conditions. This de-congealing layer may be placed anywhere in the core matrix of the heat exchanger. With the introduction of a de-congealing layer to the heat exchanger 10, turning features 30 would need to account for the larger size of a de-congealing layer and ensure that it also maintains the entry area of all adjacent channels. Shaped features can also be applied on both the inlet contraction and the outlet expansion.

Figure 10:
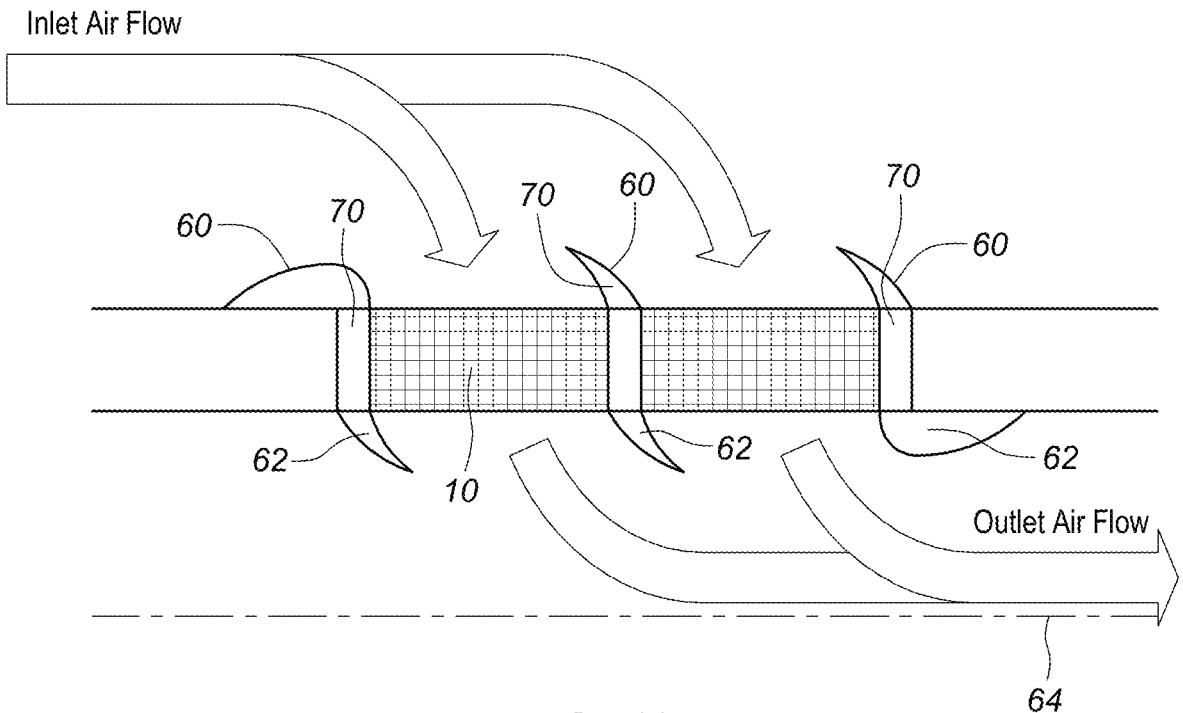
FIG. 10 illustrates a schematic of a redial in-flow heat exchanger that includes a turning de-congealing turning layer.

FIG. 10 illustrates a schematic of a radial in-flow heat exchanger that includes a turning de-congealing layer. As may be seen in FIG. 10, the heat exchanger core 10 has turning vanes or turning features on the inlet side 60 and the outlet side 62. In operation, the entire heat exchanger and the accompanying turning vanes rotates around the axis of revolution 64.

As may be seen in FIG. 10, not every inlet turning vane 60 is identical. For example, the turning vane farthest upstream on the inlet side has a different profile than the other inlet turning vanes 60. In addition, the turning vane on the farthest downstream side has a different profile than the other outlet turning vanes 62. As may be appreciated, the profile or design of any individual turning vane may be customized to produce the best flow performance and every turning vane is not required to be identical.

Figure 11:
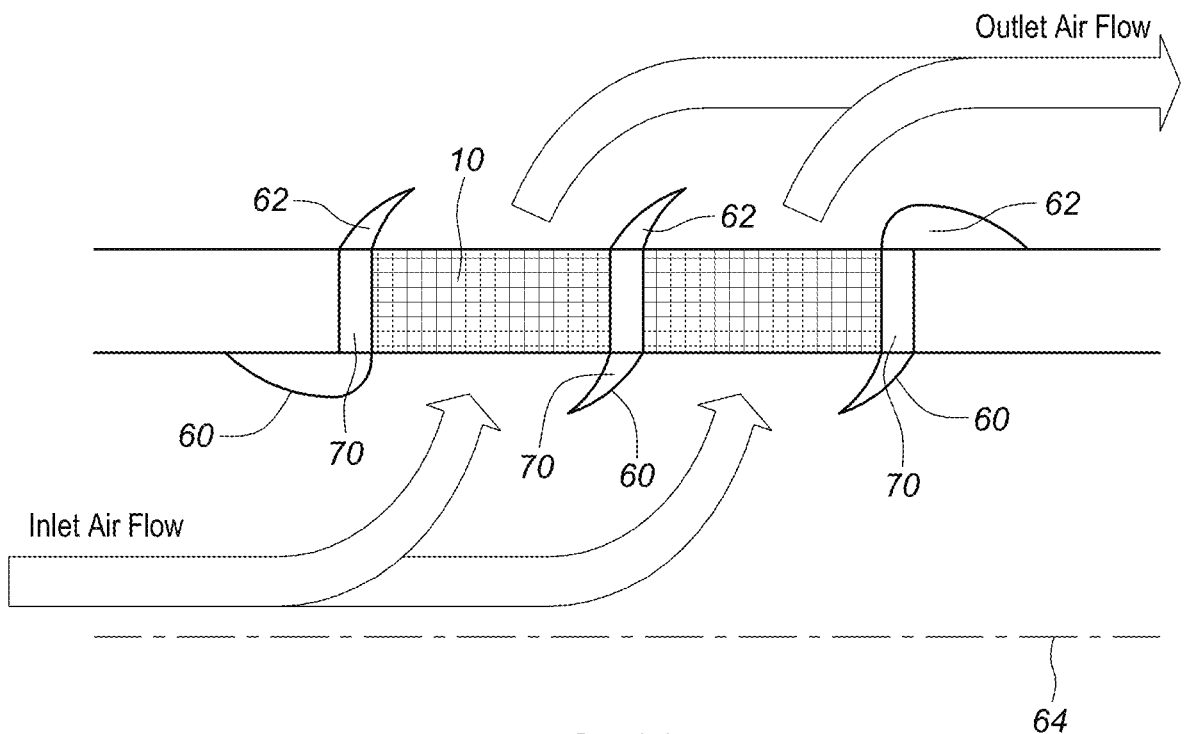
FIG. 11 illustrates a schematic of a radial out-flow heat exchanger that includes turning de-congealing layers.
Figure 12:
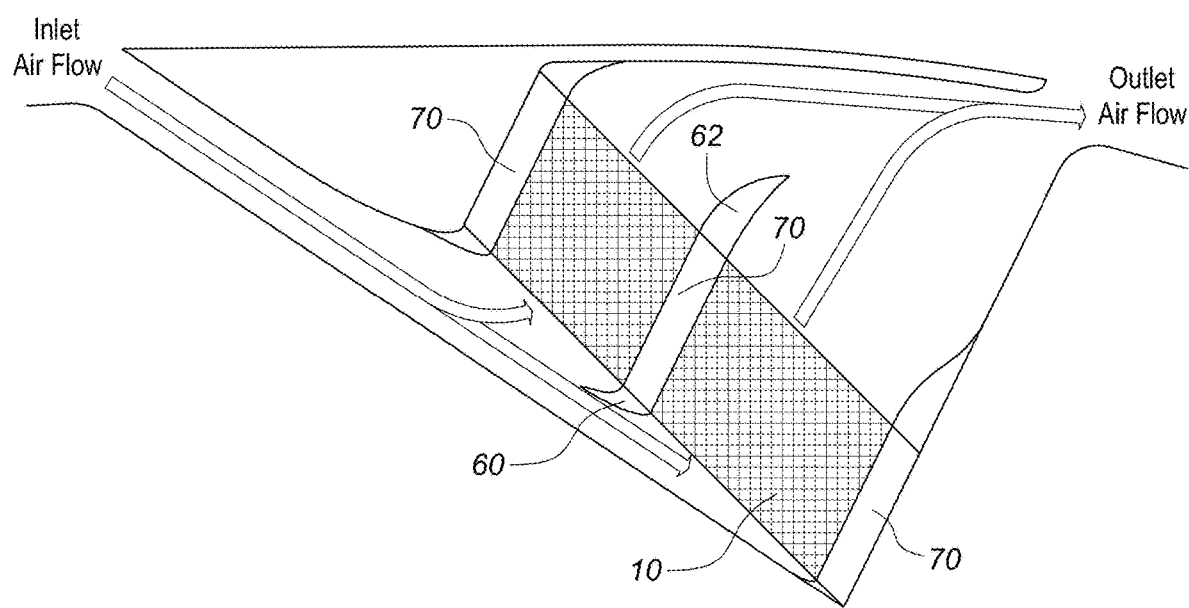
FIG. 12 illustrates an inclined heat exchanger that includes turning de-congealing layers.

Irregular features within the matrix which generate large leading bluff edges, such as de-congealing layers 70, present opportunities to incorporate turning features on both the inlet 60 and the outlet 62. As depicted in FIG. 10, this can be embodied when the remainder of the heat exchanger matrix does not include any turning features. FIG. 11 illustrates a schematic of a radial out-flow heat exchanger that includes turning de-congealing layers. FIG. 12 illustrates an inclined heat exchanger that includes turning de-congealing layers.

The use of turning vanes, or turning features, reduces the flow separation seen in FIG. 1. The turning features aid the reduction in total pressure loss by minimizing the separation region.

An inherent advantage of the use of turning vanes is also that their relative thickness allows them to provide protection to the heat exchanger core against impact from foreign objects. Accordingly, in many embodiments that employ turning vanes, the need for the 'hail' fin is negated. By eliminating the hail fin, the flow length available for heat transfer surfaces is increased. Removing the hail fin also reduces any total pressure losses associated with the additional thicker fin.

Figure 13:
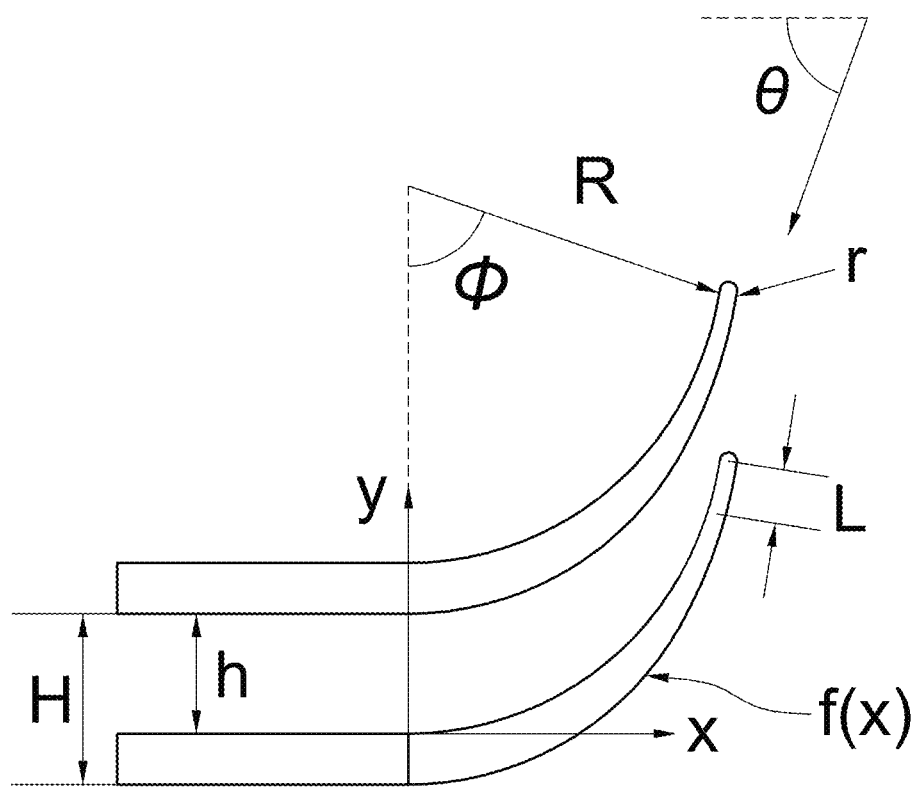
FIG. 13 illustrates a profile view of an example of a turning vane that will be used to discuss the various aspects of turning vane design.

FIG. 13 illustrates a profile view of an example of a turning vane that will be used to discuss the various aspects of turning vane design. The following nomenclature defined below will be used in conjunction with FIG. 13:

h height of the flow area within the channel
H height of the flow channel including any blocked regions associated with the channel
σ Free flow area ratio (h/H)
θ Angle of the inclined flow relative to the inlet face of the heat exchanger
R Radius of the upper turning vane surface
φ Inclusive angle describe the sector of circular profile, R
r Radius of the tip of the turning vane
L Length of turning vane straight section
A Amplitude of smoothing function
S Scaling factor of smoothing function
C Offset of smoothing function
x X coordinate
y Y coordinate The geometry described within the following paragraphs is depicted in FIG. 13. For this discussion we'll assume the flow of interest is the primary flow path of the intake duct but it could as easily be the primary flow path of the exit duct with the discussion transferred to the flow leaving the heat exchanger instead of entering the heat exchanger. The flow of interest is inclined at an angle θ with respect to the front face of the heat exchanger where 0°<θ<90°.

In the embodiment shown in FIG. 13, the upper surface of the turning vane is an arc of a circle of radius R with φ defining the inclusive angle of the circular sector, where φ<θ. In this embodiment, we would say the arc is concave with respect to the turning vane.

The upper and lower surfaces are connected by a circular arc of radius, r, which is tangent to both the upper and lower surfaces. A sharp tipped turning vane can be defined with r=0.

The lower surface of the turning vane starts with a straight section of length, L, where L≤R, inclined at an angle θ with respect to the direction of the channels (i.e. aligned with the incoming flow). A truncated turning vane shape can also be defined where L=0. A smooth curve is used to transition from the straight section of length L to the front face of the heat exchanger. This curve can take on many forms including a circular arc, radius, spline, polynomial, hyperbolic etc. In all cases, the curve has only one inflection point, is continuous, and is tangent to both the straight section of length L on one end and the channel inlets on the other end. The lower surface should match the incoming flow angle at its tip and be tangential with the channel surface at the heat exchanger interface. We say that the curve is convex with respect to the turning vane feature.

One such manifestation of the smoothing curve is provided by the hyperbolic cosine function below, where x is the offset from the front face of the heat exchanger and f(x) is a function describing the curve.

$$f(x) = A\left(\cosh\left(\frac{x}{S}\right) - 1\right) + C$$

In defining the smooth curve, the origin of the coordinate system is defined as the contact point between the upper surface's circular arc and the channel inlet. The meeting point between the smooth curve and the straight section of length L is defined by the coordinates $(x_4, y_4)$.

$$x_4 = R\sin(\phi) + r(\sin(\theta) + \sin(\phi)) - L\cos(\theta)$$

$$y_4 = R(1-\cos(\phi)) - r(\cos(\theta) + \cos(\theta)) - L\sin(\theta)$$

The amplitude, scaling factor and offset in the curve definition satisfy the following equations;

$$C = h\left(1 - \frac{1}{\sigma}\right)$$

$$A = \frac{y_4 - C}{\cosh\left(\frac{x_4}{S}\right) - 1}$$

$$S\tanh\left(\frac{x_4}{2S}\right) = \frac{y_4 - C}{\tan(\theta)}$$

In preferred embodiments, the geometry of the turning vanes is linked to the geometry of heat exchanger.

To define the expansion rate from the turning vane into the heat exchanger channel, the expansion rate can be linked to the incoming flow regime. A rule can be created for the expansion rate based upon the area's derivative.

Coupling the Turning Vane

As mentioned earlier in this paper, the turning vanes may be coupled to the heat exchanger using a variety of methods. However, the three best methods of attaching the turning vanes are 1.) Mechanical; 2.) Bonding (adhesive); and 3.) Brazing.

The mechanical and bonding methods would offer a level of repairability. In the case of a purely mechanical attachment method, the turning vanes could be field replaceable. Bonded turning vanes would have to be returned to a repair center for overhaul. Brazed turning vanes would not be readily repairable.

Figure 14:
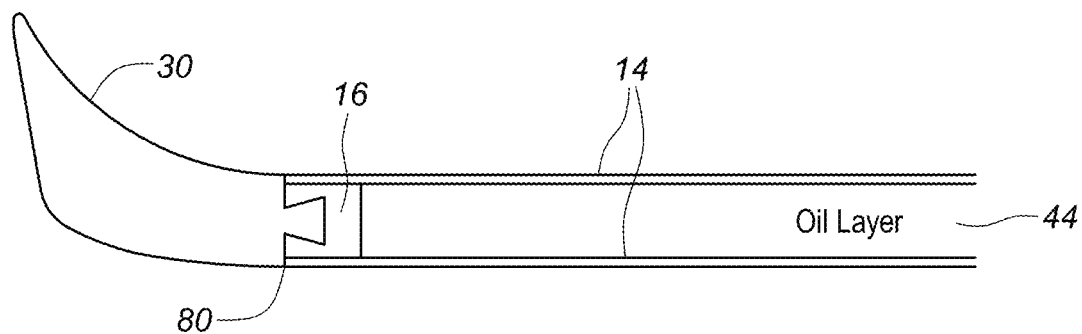
FIG. 14 illustrates a cross-sectional view of a turning vane mechanically attached to the side bar of a heat exchanger using a dovetail joint.
Figure 15:
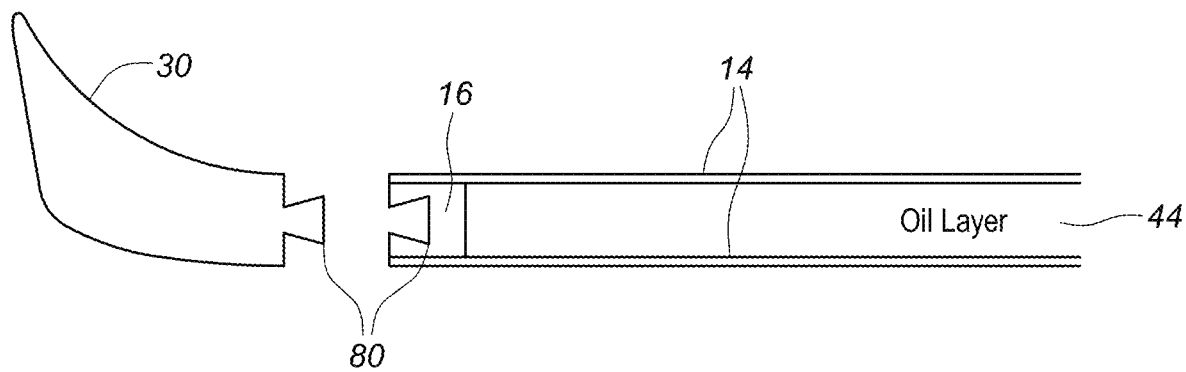
FIG. 15 illustrates an exploded view of the turning vane dovetail joint assembly of FIG. 15A.

Whilst a number of mechanical attachment methods have been assessed, due to the size range of the oil layers (between 1.3-6.4 mm), the most practical solution is a dovetail joint. FIG. 14 illustrates a cross-sectional view of a turning vane 30 mechanically attached to the side bar 16 of a heat exchanger using a dovetail joint 80. FIG. 15 illustrates an exploded view of the turning vane dovetail joint of FIG. 15A.

As may be appreciated from FIGS. 14 and 15, the oil layer 44 is encased by two separation sheets 14 and a side bar 16. In the embodiments of FIGS. 14 and 15, the female portion of the dovetail joint 80 is formed in the side bar 16, typically by machining. The turning vane 30 is then formed with the male portion of the dovetail joint 80 and the two may be mechanically joined at the dovetail joint 80.

In the case of a mechanical connection like the dovetail joint 80, the turning vane 30 could be held in place by friction. However, in addition, adhesive could be used in combination with the dovetail joint 80. In yet other embodiments, the duct walls in which the heat exchanger would reside may also prevent the turning vanes 30 from detaching. These duct walls would cover either end of the dovetail slot once the heat exchanger is in situ within the installation.

Figure 16A:
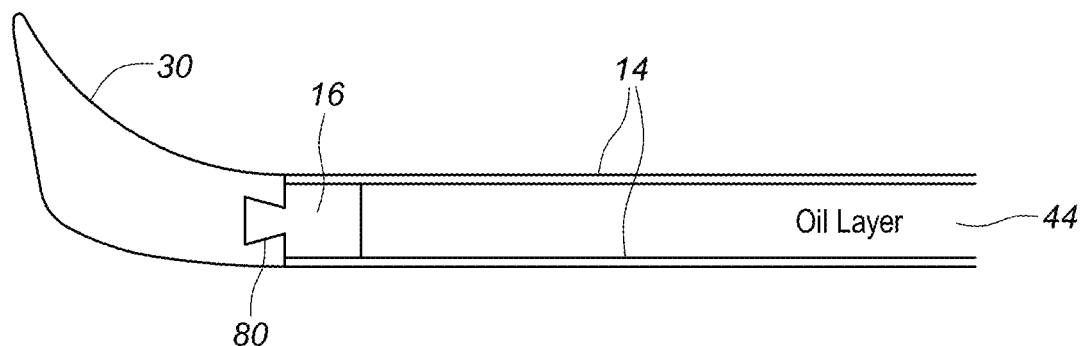
FIG. 16A illustrates a cross-sectional view of the same mechanically attached turning vane as shown in FIGS. 14 and 15 but with the male and female portions swapped.
Figure 16B:
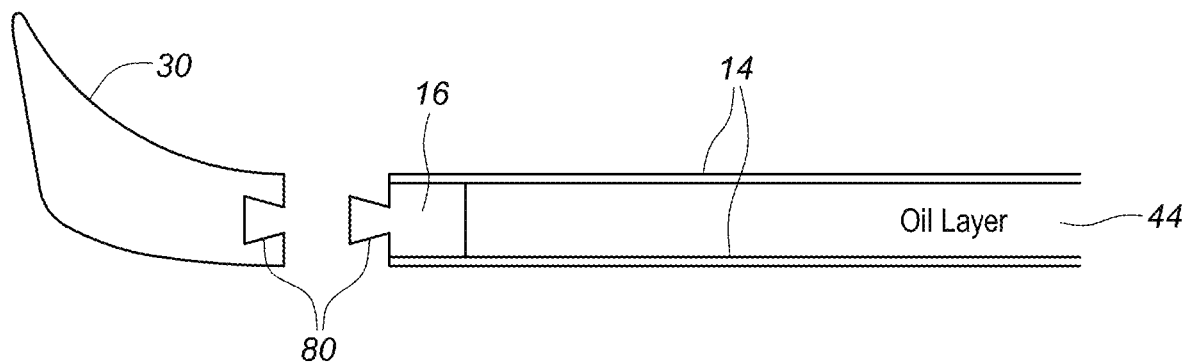
FIG. 16B illustrates an exploded view of the assembly of FIG. 16A.

FIG. 16A illustrates a cross-sectional view of the same mechanically attached turning vane 30 as FIGS. 14 and 15 but with the male and female portions swapped. FIG. 16B illustrates an exploded view of FIG. 16A. The male portion of the dovetail joint could be incorporated into the turning vane, as shown in FIGS. 14 and 15, or into the side bar as shown in FIGS. 16A and 16B.

If the installation or the aerodynamic forces do not allow for the turning vanes to be held purely by friction, then adhesive can be used to add further security. In its uncured state, the adhesive could be used as a lubricant during the assembly process before entering the curing processes.

If elevated temperatures are required to cure the adhesive, it is imperative that the activation temperature is in excess of the maximum temperatures likely to be encountered in service. To aid the cure of the adhesive, the heat exchanger could be utilized by flow heated fluid through the oil passages, this could reduce the reliance on ovens which may be impractical for large heat exchangers.

Figure 17A:
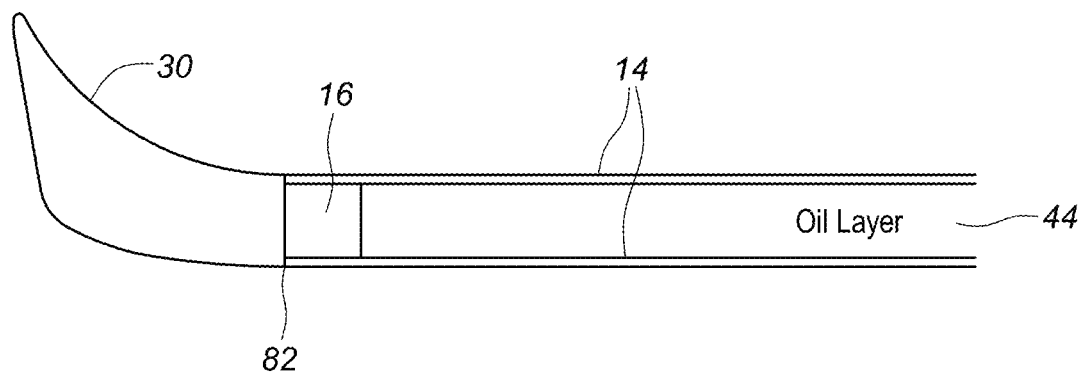
FIG. 17A illustrates a cross-sectional view of a turning vane coupled to the sidebar of a heat exchanger using adhesive as a bonding agent at a bonding joint.
Figure 17B:
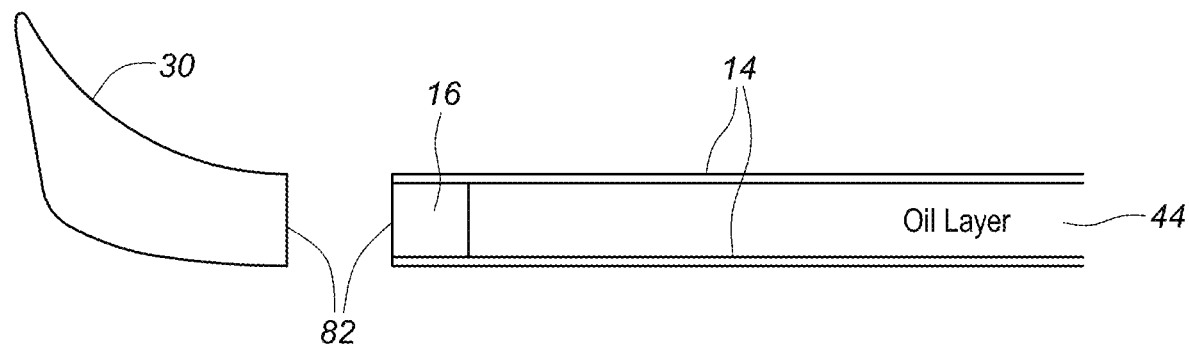
FIG. 17B illustrates an exploded view of the assembly in FIG. 17A.

FIG. 17A illustrates a cross-sectional view of a turning vane 30 coupled to the sidebar 16 of a heat exchanger using adhesive as a bonding agent at a bonding joint 82. FIG. 17B illustrates an exploded view of the assembly in FIG. 17A. In the simplest form, the turning vanes are bonded directly to the side bars as shown in FIGS. 17A and 17B.

Figure 18A:
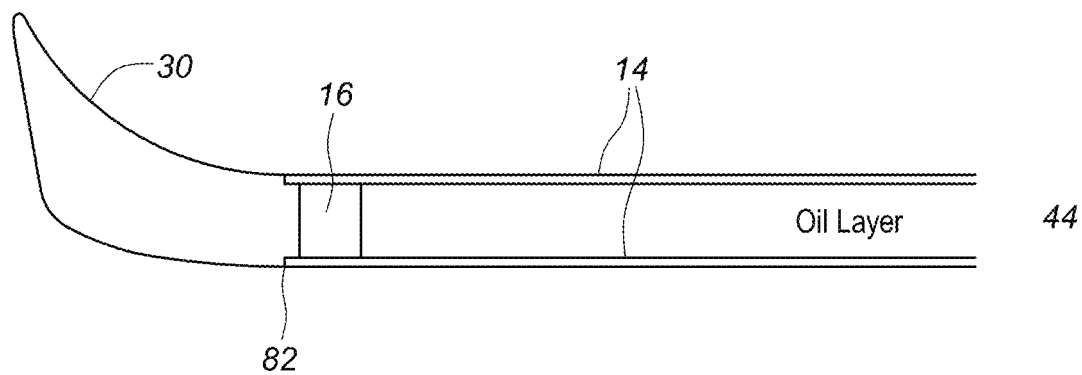
FIG. 18A illustrates a cross-sectional view of a turning vane coupled to the sidebar 16 of a heat exchanger using adhesive as a bonding agent at a bonding joint with a recessed sidebar 16.
Figure 18B:
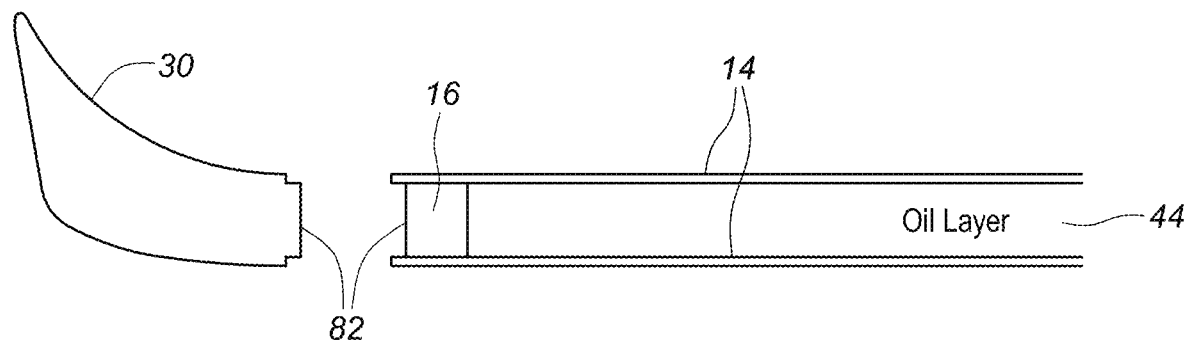
FIG. 18B illustrates an exploded view of the assembly in FIG. 18A.

FIG. 18A illustrates a cross-sectional view of a turning vane 30 coupled to the sidebar 16 of a heat exchanger using adhesive as a bonding agent at a bonding joint 82 with a recessed sidebar 16. FIG. 18B illustrates an exploded view of the assembly in FIG. 18A. As may be seen in the embodiment of a bonded joint 82 shown in FIGS. 18A and 18B, a thinner sidebar 16 could be recessed into the heat exchanger core providing a larger surface area for the bond to key into. In such an embodiment, the separation sheets 14 extend out past the end of the sidebar 16 providing three surfaces to mate to, which can result in a more stable bond.

Figure 19:
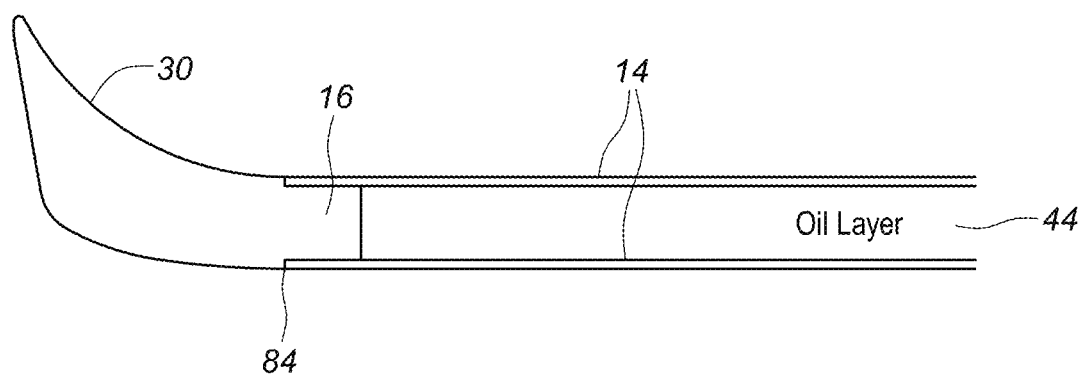
FIG. 19 illustrates a cross sectional view of a turning vane incorporated directly into the side bars of a plate and fin heat exchanger and brazed into the heat exchanger core itself.

In yet other embodiments, the turning vane concepts can be incorporated directly into the sidebars 16 of current state-of-art plate & fin heat exchangers and then be brazed 84 into the heat exchanger core itself. FIG. 19 illustrates a cross sectional view of a turning vane 30 incorporated directly into the sidebars 16 of a plate and fin heat exchanger and brazed into the heat exchanger core itself. As may be seen in FIG. 19, the sidebar 16 and the turning vane 30 are one continuous piece.

Figure 21:
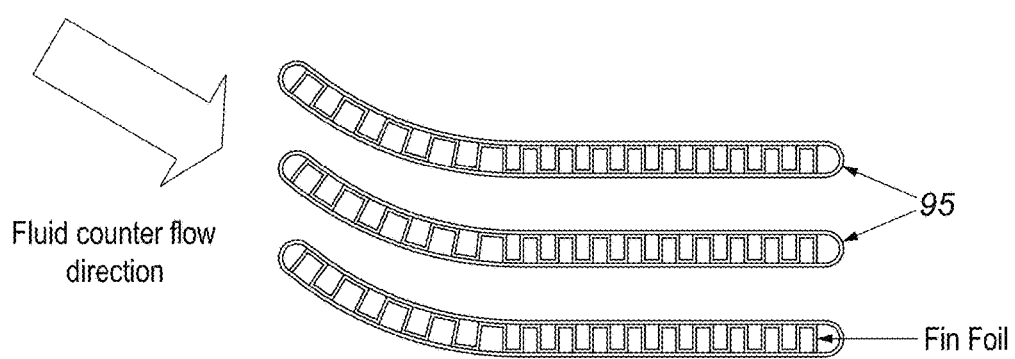
FIG. 21 illustrates a cross-sectional view of an embodiment of a heat exchanger where the pressed plate channels are curved to match the primary flow direction of the intake duct.

In embodiments where the turning vane is manufactured as part of the heat exchanger, the turning vanes could also be used as a heat transfer surface as shown in FIG. 21. The integrated turning vanes could have internal passages to form part of the fluid or gas circuit creating an active heat transfer surface.

Figure 20:
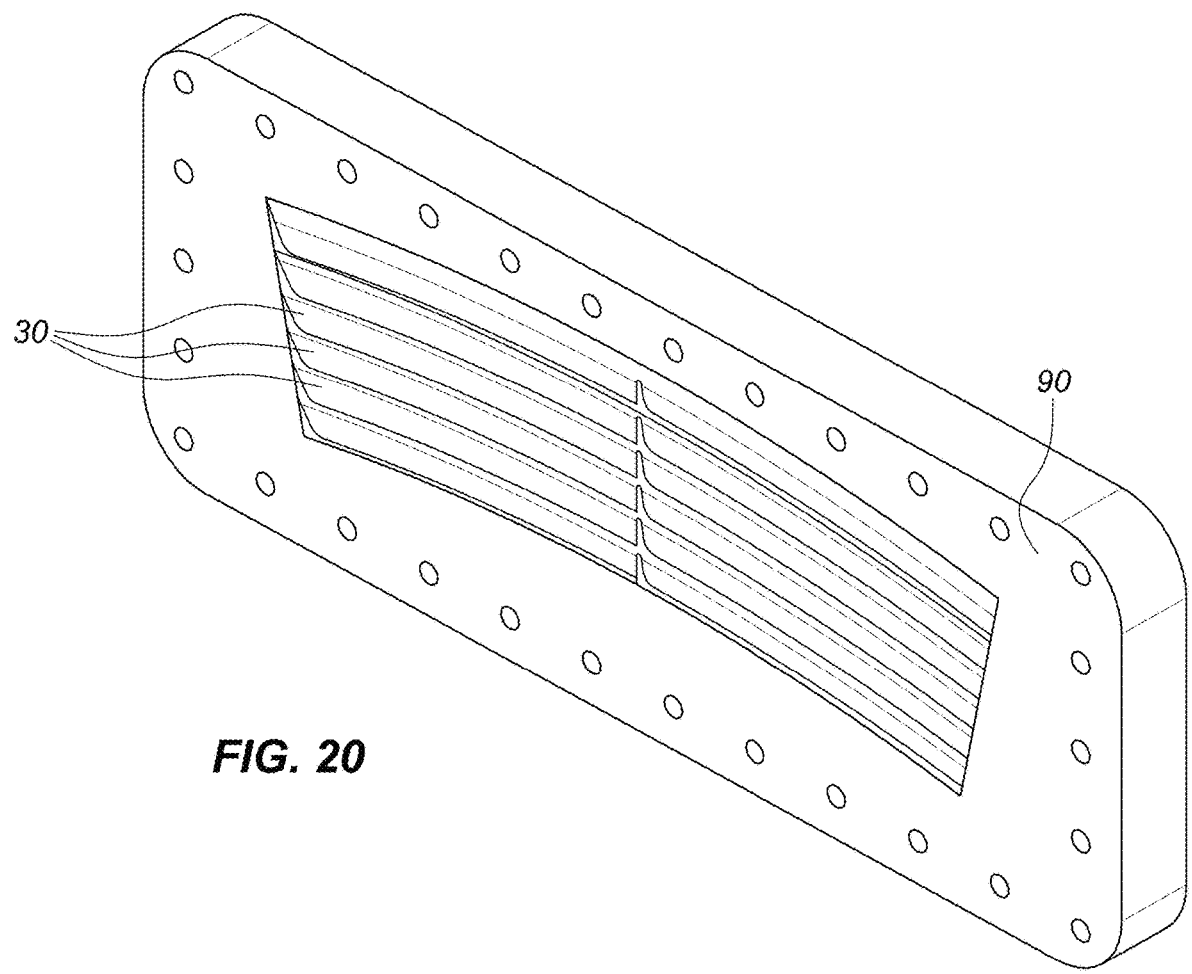
FIG. 20 illustrates an isometric view of a flange with a plurality of turning vanes mounted into the flange.

Due to spatial limitations or unique specification constraints, in some embodiments, it may be necessary to physically separate the turning vanes from the body of the heat exchanger. FIG. 20 illustrates an isometric view of a flange 90 with a plurality of turning vanes 30 mounted into the flange 90. The flange 90 may be mounted directly upstream of the heat exchanger with the vanes aligned to the layers within the heat exchanger. In yet other embodiments, a similar flanged could be used on the downstream side of the heat exchanger as well.

Turning Vane Manufacturing Methodology and Material Selection

A variety of the manufacturing methods and materials can be used to generate the turning vanes and the heat exchangers associated therewith. Table 1 outlines the manufacturing processes and materials available for the described designs.

| Attachment Method | Turning Vane Material | Turning Vane Manufacturing Method |
|---|---|---|
| Brazed | Aluminium | Extrusion |
| | | Additive Manufactured (AM) |
| Bonded and/or Mechanical Joint | Aluminium | Extrusion |
| | | AM |
| | Polymer | Extrusion |
| | | Moulded |
| | | AM |
| | Elastomer | Extrusion |
| | | Moulded |
| | | AM |
| Flange Mounted | Aluminium | AM |
| | | Cast |
| | Polymer | Moulded |
| | | AM |
| | Elastomer | Moulded |
| | | AM |

Note that polymers and elastomers include materials reinforced with ceramics or graphites.

Note that polymers and elastomers include materials reinforced with ceramics or graphites.

Heat Exchanger Curvature

Rather than adding on extrusions in the form of turning vanes, in other embodiments, the turning vane concept can be achieved by actually curving the internal matrix 95 of the heat exchanger itself. FIG. 21 illustrates a cross-sectional view of an embodiment of a heat exchanger where the pressed plate channels 95 are curved to match the primary flow direction of the intake duct. As may be seen in FIG. 21, the actual fluid layers themselves are curved to match the intake air flow direction.

In embodiments where the fluid layers are curved, the angle of turn is very dependent on the flow length. For short flow lengths, it may be necessary to incorporate the protrusion style turning vane features taught herein in combination with the curved heat exchanger matrix shown in FIG. 21.

The concept of turning the actual fluid channels can be applied to state-of-the-art plate and fin heat exchangers. It may also be applied to the alternative layer configurations, namely extruded channel and pressed plate heat exchangers. It may also be applied to heat exchangers created using additive manufacturing like those discussed in U.S. patent application Ser. Nos. 16/242,432 and 16/534,887, which are hereby incorporated by reference in their entireties. In any such embodiment, additive manufacturing techniques may be used to manufacture the complex geometry of the curved layers.

Creating heat exchangers with curved layers to match the inlet or exit flow paths may be applied to both installations with normal or inclined inlet flow and also to systems where the inlet and outlet planes of the heat exchanger are not parallel, where the inlet and outlet flow angles will be different.

Curving the layers of the heat exchanger to match the inlet or exit flow path may be used in both active heat transfer layers and in oil layers not used for heat transfer such as de-congealing layers.

Figure 22:
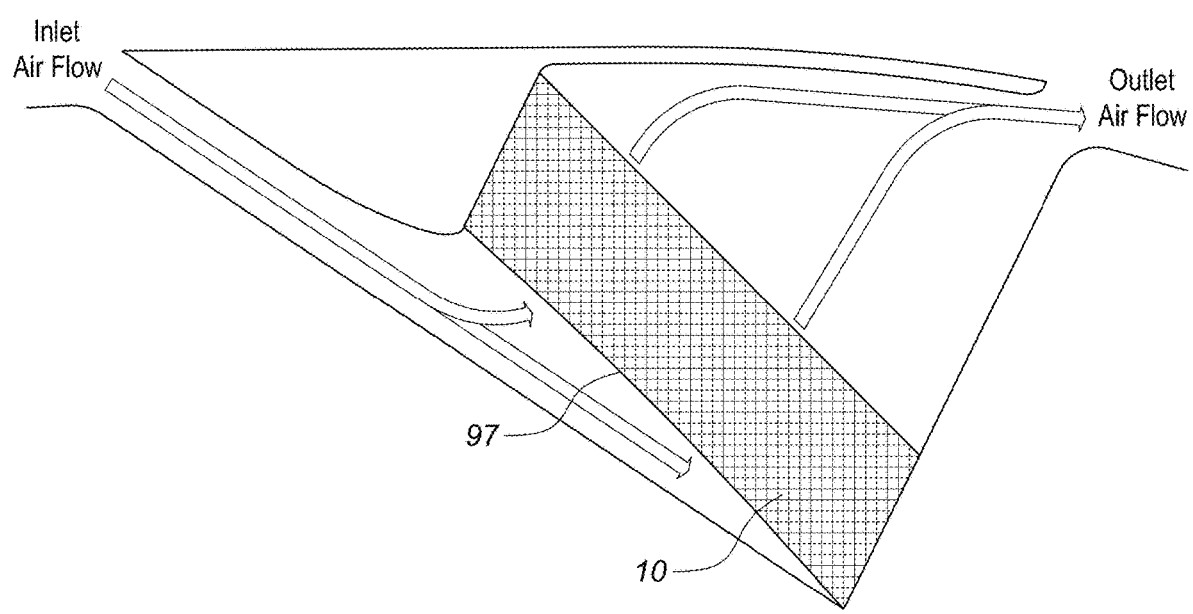
FIG. 22 illustrates a cross-sectional view of a heat exchanger with a curved inlet face.

The curved heat exchanger channels could also be married to a heat exchanger with a curved inlet face to further optimize the performance without increasing the overall system volume. FIG. 22 illustrates a cross-section view of a heat exchangers with a curved inlet face.

For the structured lattice style heat exchanger, such as the 'Double Diamond' taught in U.S. patent application Ser. No. 16/242,432 or the 'Spiral Tube' concept taught in U.S. patent application Ser. No. 16/534,887, the turning features described in herein could be embodied in at least two styles.

In some embodiments, the lattice pattern of the heat exchanger is not always oriented with the flow direction. In such embodiments, turning vanes may still be used and oriented to smooth the flow into the heat exchanger matrix even when the matrix layers are unconventionally oriented.

Figure 23:
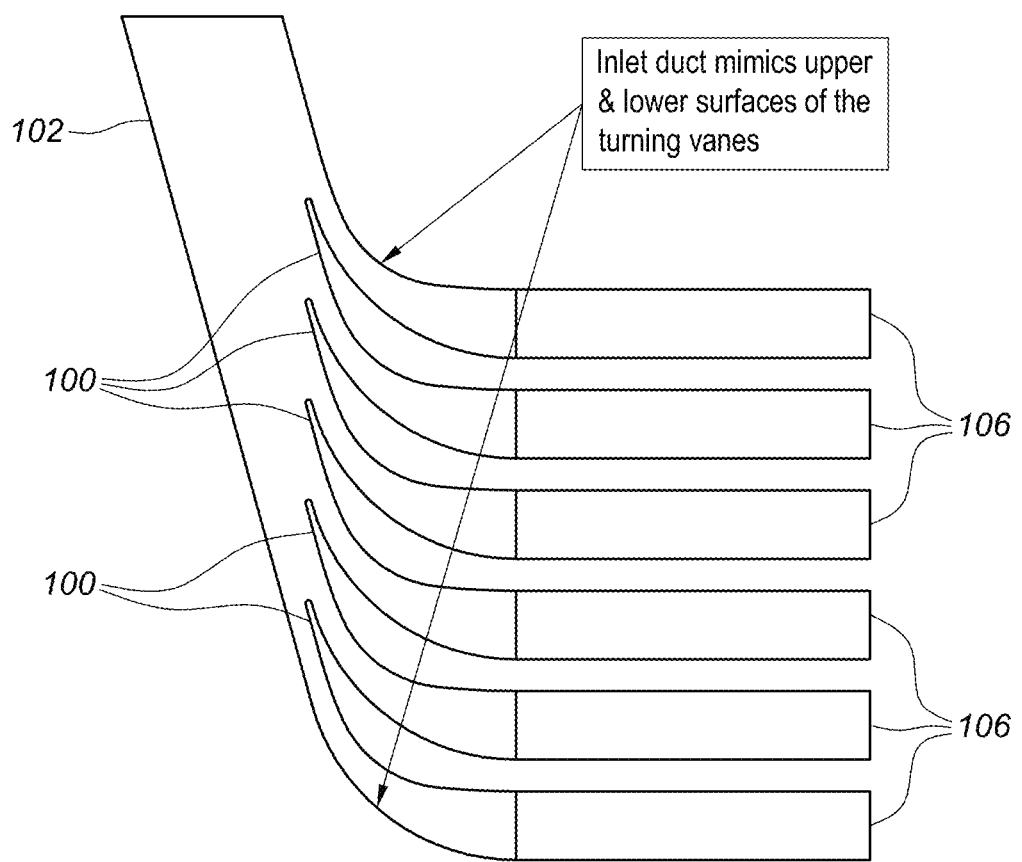
FIG. 23 illustrates a cross-sectional view of an inlet duct that has turning vane geometry incorporated in the inlet duct design.

In some embodiments, elements of the turning vane geometry may be incorporated into the duct geometry instead of into the heat exchanger. FIG. 23 illustrates a cross-sectional view of an inlet duct that has turning vane geometry incorporated in the inlet duct design. As may be seen in FIG. 23, the inlet duct 102 separates into multiple channels and mimics the upper and lower surfaces of the turning vanes, thus forming turning vanes 100 there between. The multiple channels of the inlet duct 102 flow directly into the heat exchanger channels 106.

Figure 24:
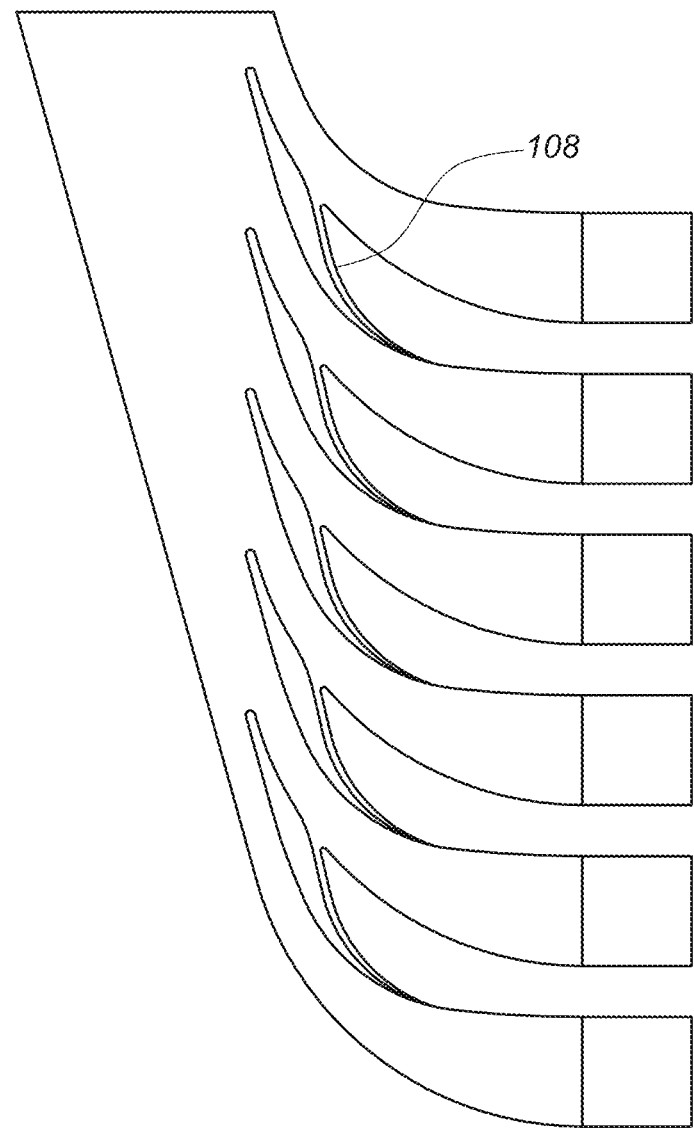
FIG. 24 illustrates a cross-sectional view of turning vanes that include slots/holes within the turning vane.

In yet other embodiments, slots/holes within the turning vane may be incorporated to help induce flow attachment as the flow expands out of the turning vane. FIG. 24 illustrates a cross-sectional view of turning vanes that include slots/holes 108 within the turning vane.

The turning vanes in all their various styles taught herein could be used with any type of heat exchanger including but not limited to gas-gas or gas-liquid heat exchangers. They may be used with plate and fin heat exchangers, additive manufacturing heat exchangers, radial inflow and outflow heat exchangers or any other type of heat exchanger without departing from the scope of what's taught herein.

What is claimed is:

1. A heat exchanger assembly comprising:
   an inlet duct;
   a heat exchanger coupled to the inlet duct wherein the intake plane of the heat exchanger is at an angle between 0 degrees and 90 degrees to the primary flow direction of the inlet duct;
   a plurality of turning vanes coupled to the heat exchanger and protruding into the inlet duct, the plurality of turning vanes comprising:
      a straight leading edge of length L that is parallel to the primary flow direction of the inlet duct;
      a convex lower surface that transitions a bottom of the leading edge to an upper wall of a lower channel situated below the convex lower surface of the turning vane; and
      a concave upper surface that transitions a distal tip of the turning vane to a lower wall of an upper channel situated above the concave upper surface of the turning vane wherein the distal tip is defined by an arc with radius r and wherein the distal tip is tangential to both the leading edge and the concave upper surface.

2. The heat exchanger assembly of claim 1, wherein the heat exchanger is a plate and fin heat exchanger.

3. The heat exchanger assembly of claim 1, where the convex lower surface is tangential to the bottom of the straight leading edge.

4. The heat exchanger assembly of claim 1, where the convex lower surface is tangential to the upper wall of the lower channel.

5. The heat exchanger assembly of claim 2, wherein the plurality of turning vanes are each coupled to a sidebar of the plate and fin heat exchanger.

6. The heat exchanger assembly of claim 5, wherein the plurality of turning vanes are each mechanically coupled to a sidebar of the plate and fin heat exchanger.

7. The heat exchanger assembly of claim 2, wherein the plurality of turning vanes are each formed as an integrated part of a sidebar of the plate and fin heat exchanger.

8. The heat exchanger assembly of claim 1, wherein a throat followed by a diffuser is formed between adjacent turning vanes in the plurality of turning vanes.

9. The heat exchanger assembly of claim 1, wherein each turning vane in the plurality of turning vanes includes additional surface features.

10. The heat exchanger assembly of claim 1, wherein the heat exchanger comprises a heat exchanger matrix that is curved in the direction of an inlet or outlet flow.

11. The heat exchanger assembly of claim 1, wherein the heat exchanger is a radial inflow or a radial outflow heat exchanger.

12. The heat exchanger assembly of claim 5, wherein each turning vane in the plurality of turning vanes is located on every other sidebar.

13. The heat exchanger assembly of claim 1, further comprising a second plurality of turning vanes coupled to the heat exchanger and protruding into the outlet duct.

14. The heat exchanger assembly of claim 1, wherein the distal tip is a point with a radius r of zero.

15. A heat exchanger assembly comprising:
   an inlet duct;
   a heat exchanger coupled to the inlet duct wherein the intake plane of the heat exchanger is at an angle between 0 degrees and 90 degrees to the primary flow direction of the inlet duct; and
   a plurality of turning vanes coupled to the heat exchanger and protruding into the inlet duct, each turning vane in the plurality of turning vanes comprising:
      a straight leading edge of length L that is parallel to the primary flow direction of the inlet duct;
      a convex lower surface that transitions a bottom of the leading edge to an upper wall of a lower channel situated below the convex lower surface of the turning vane; and
      a concave upper surface that transitions a distal tip of the turning vane to a lower wall of an upper channel situated above the concave upper surface of the turning vane and wherein the concave upper surface extends an entire distance between the distal tip and the lower wall of the upper channel wherein the distal tip is defined by an arc with radius r and wherein the distal tip is tangential to both the leading edge and the concave upper surface.

16. The heat exchanger assembly of claim 15, where the convex lower surface is tangential to the bottom of the straight leading edge.

17. The heat exchanger assembly of claim 15, wherein a throat followed by a diffuser is formed between adjacent turning vanes in the plurality of turning vanes.

18. A heat exchanger assembly comprising:
   an inlet duct;
   a heat exchanger coupled to the inlet duct wherein the intake plane of the heat exchanger is at an angle between 0 degrees and 90 degrees to the primary flow direction of the inlet duct; and
   a plurality of turning vanes coupled to the heat exchanger and protruding into the inlet duct, each turning vane in the plurality of turning vanes comprising:
      a straight leading edge of length L that is parallel to the primary flow direction of the inlet duct;
      a convex lower surface that transitions a bottom of the leading edge to an upper wall of a lower channel situated below the convex lower surface of the turning vane;
      a concave upper surface that transitions a distal tip of the turning vane to a lower wall of an upper channel situated above the concave upper surface of the turning vane wherein the distal tip is defined by an arc with radius r and wherein the distal tip is tangential to both the leading edge and the concave upper surface;

and wherein each turning vane in the plurality of turning vanes is coupled to a sidebar of the heat exchanger.

19. The heat exchanger assembly of claim 18, wherein a throat followed by a diffuser is formed between adjacent turning vanes in the plurality of turning vanes.

* * * * *